United States Patent
Maier

(10) Patent No.: US 7,267,013 B2
(45) Date of Patent: Sep. 11, 2007

(54) SYSTEM AND METHOD OF MEASURING FLUID FLOW

(75) Inventor: Steven Maier, Poway, CA (US)

(73) Assignee: Teledyne RD Instruments, Inc., Poway, CA (US)

( * ) Notice: Subject to any disclaimer, the term of this patent is extended or adjusted under 35 U.S.C. 154(b) by 0 days.

(21) Appl. No.: 11/247,396

(22) Filed: Oct. 11, 2005

(65) Prior Publication Data
US 2006/0075829 A1    Apr. 13, 2006

Related U.S. Application Data

(60) Provisional application No. 60/617,673, filed on Oct. 12, 2004.

(51) Int. Cl.
*G01F 1/32* (2006.01)
(52) U.S. Cl. .................................. 73/861.23
(58) Field of Classification Search ............ 73/861.23, 73/861.25, 24.06, 861.26
See application file for complete search history.

(56) References Cited

U.S. PATENT DOCUMENTS

| 3,956,928 A | * | 5/1976 | Barrera ........................ 73/116 |
| RE35,535 E | | 6/1997 | Brumley et al. |
| 6,647,804 B1 | | 11/2003 | Deines |
| 6,782,150 B2 | * | 8/2004 | Davis et al. ................... 385/12 |

OTHER PUBLICATIONS

HR Wallingford, Enhancement to Algorithm for Sewer Flow Monitor, Beckton/Crossness Models, Report EX 3076 Sep. 1994.
HR Wallingford, Algorithms for Estimating Flow in Sewers, Beckton/Crossness Models, Report EX 2538 Mar. 1992.

* cited by examiner

*Primary Examiner*—Jewel Thompson
(74) *Attorney, Agent, or Firm*—Knobbe, Martens, Olson & Bear LLP

(57) ABSTRACT

A systems and method of measuring fluid flow within a pipe is disclosed. One embodiment includes a flow measuring device configured to be placed within a pipe. Another embodiment includes a method of calculating fluid flow based on measured fluid velocities.

23 Claims, 5 Drawing Sheets

SYSTEM AND METHOD OF MEASURING FLUID FLOW

RELATED APPLICATIONS

This application claims the benefit of, and incorporates by reference in its entirety, U.S. Provisional Application No. 60/617,673, filed Oct. 12, 2004.

BACKGROUND OF THE INVENTION

1. Field of the Invention

The present invention relates to measuring fluid flow. In particular, embodiments of the invention relate to measuring fluid flow in pipes.

2. Description of the Related Technology

There are many environments where information regarding the mass and/or volume flow rate of a fluid through a conduit is valuable. These include irrigation, residential water distribution, sewage treatment, and many others. Measuring fluid flow speed in pipes may be performed using a variety of sensing techniques. Although various types of mechanical flow meters have been used, acoustic methods are often preferable because of their ease of installation, lack of interference with the flow, and long term reliability. One type of acoustic flow measurement device utilizes the Doppler effect to measure flow speed. With these devices, sound energy is reflected off of particles moving with the flowing fluid and is received by a receiving transducer. Sound energy received by the receiving transducer is frequency shifted due to the relative motion between the particles and the receiving transducer. The frequency shift is related to the flow rate of the fluid.

Typically, these techniques involve a sensor installed within the pipe which measures the actual fluid speed at some point(s), along with the level of the fluid above the sensor and applies a numerical model to estimate total flow or Q. A limitation of many of the current pipe flow measurement techniques is that the sensor and its interconnect cable disturb the flow is being measured. Thus, a need exists for improved systems and methods of measuring fluid flow in pipes.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved accuracy of flow measurements.

One embodiment includes a device for measuring fluid flow in a pipe. The device includes a transducer configured to acoustically measure the velocity of fluid flow through a pipe and a housing configured to receive the transducer. The housing includes a first surface configured to conform to the shape of the pipe and a second surface configured to direct the fluid flow over the transducer.

Another embodiment includes a device for measuring fluid flow in a pipe. The device includes means for measuring the velocity of fluid flow through a pipe and means for housing the transducer. The housing means conforming to the shape of the pipe and directing the fluid flow over the transducer.

Another embodiment includes a device for housing a transducer in a pipe. The device includes a recess configured to receive a transducer, a first surface configured to conform to the shape of a pipe, and a second surface having an opening to the recess and configured to direct the fluid flow over the transducer.

Another embodiment includes a method of measuring fluid flow in a pipe. The method includes parameterizing a fluid flow in terms of a plurality of variables. The method further includes measuring fluid velocities at a plurality of locations within the pipe. The method further includes predicting fluid flow velocities at the plurality of locations using a range of values for each of the plurality of variables. The method further includes identifying which of the values of the variables within the respective range of values predicts fluid velocities at the plurality of locations that are closest to the measured fluid velocities. The method further includes determining fluid flow within the pipe using the identified values of the variables.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

One embodiment includes an ADCP configured to measure fluid flow in a pipe. A transducer for the ADCP is connected to the ADCP by a cable. The transducer is housed in a flow stabilization structure that is configured to measurement errors induced by the effect of the transducer and its cable.

Figure 1:
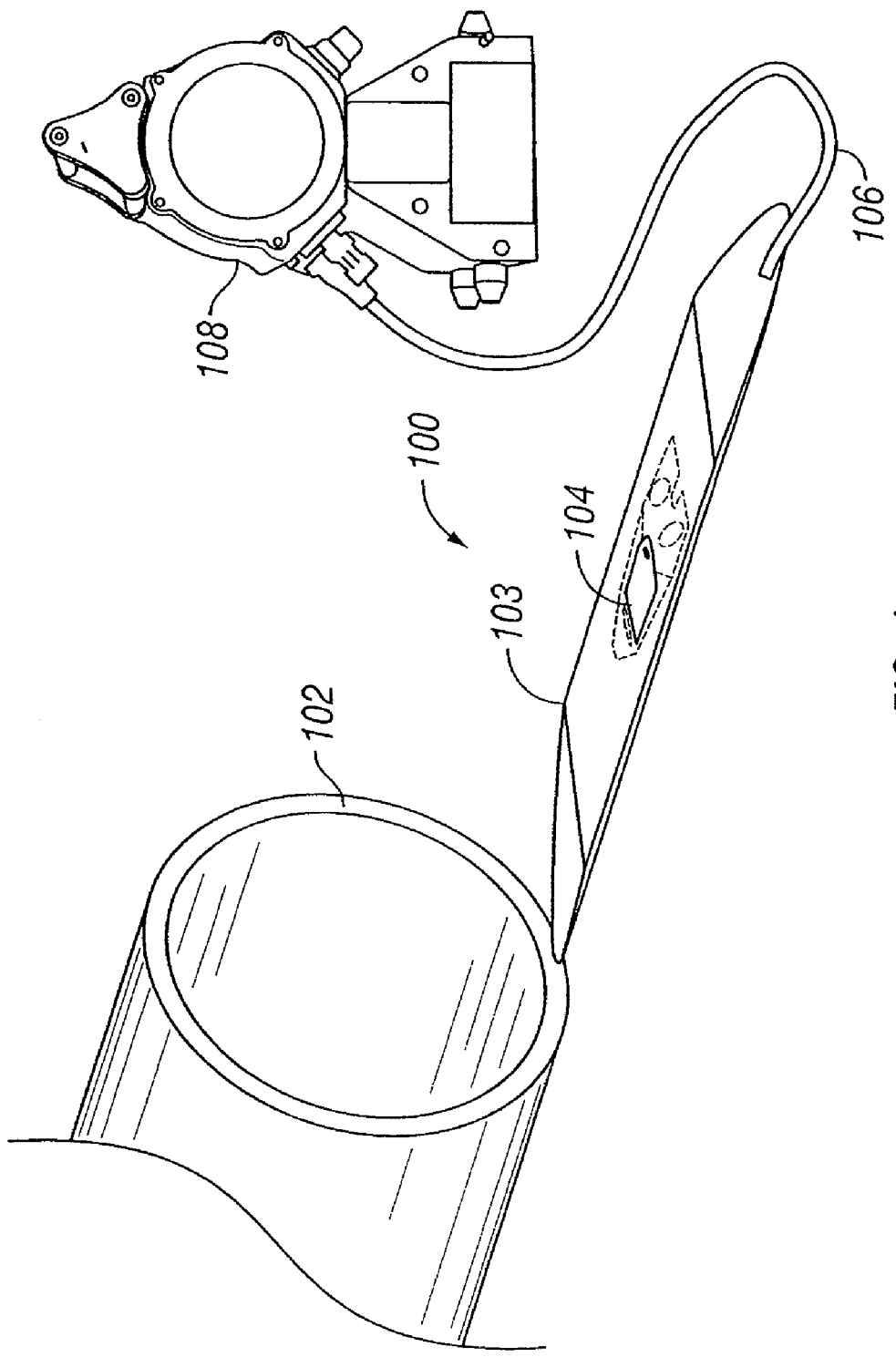
FIG. 1 is a perspective view illustrating an exemplary flow measuring device in relation to a pipe into which it may be inserted.

FIG. 1 is a perspective view illustrating an exemplary flow measuring device 100 in relation to a pipe 102 into which it may be inserted. In one embodiment, the flow measuring device includes a housing 103 that at least partially surrounds a transducer 104. The transducer 104 is connected by a cable 106 to an electronics assembly 108.

In one embodiment, the housing 103 includes a lower surface that is shaped to approximately conform to the curve of the inner surface of the pipe 102 and an upper surface that is configured to be relatively flat in the area around the transducer 104. In one embodiment, the housing 103 is thickest near the center where the transducer 104 is housed and tapers longitudinally (in the direction of fluid flow when positioned in the pipe 102) to a minimal thickness at the ends of the housing 103. In one embodiment, the cable 106 enters the housing 103 down stream of the flow of fluid through the pipe 102.

In one embodiment, the housing 103 is cast or machined from urethane or another suitable non-corrosive material. The material used may vary depending on the fluid flowing within the pipe 102. In one embodiment, the housing 103 includes a recess on its upper surface into which the transducer is flush fit.

In certain embodiments, the transducer 104 may be a commercially available transducer such as an "accQmin" transducer or ADFM transducer, available from Teledyne RD Instruments, San Diego, Calif., or other flow measurement devices configured for use in open channels or pipes using acoustic sensor technology. Examples include devices available from Accusonics, ISCO, American Sigma, or Reitmuller.

In one embodiment, the electronics assembly 108 includes components such as a mixer network, low pass filter network, sampling module, and digital signal processor (DSP). In one embodiment, the electronics assembly 108 includes a processor configured to process the velocity data as described herein to determine fluid flow data. In another embodiment, the electronics package is electronically connected to an additional processor, e.g., in a desktop or other general purpose computer (not shown), that is programmed to process the velocity data.

In one embodiment, a pulsed broadband Acoustic Doppler Current Profiler (ADCP) such as manufactured by Teledyne RD Instruments, Inc. of San Diego, Calif., is used in conjunction with a transducer array to generate acoustic signals having a nominal frequency of 2.4 MHz for transmission and analyze received acoustic signals, thereby providing information relating to the fluid velocity and mass flowrate Q within a pipe. The construction and operation of one such sonar system is described in U.S. Pat. No. Re. 35,535 entitled "Broadband Acoustic Doppler Current Profiler," which is incorporated by reference herein in its entirety. In other embodiments, other types and configurations of sonar systems may be used to generate and/or analyze the signals applied to or generated by the transducer array. For example, in one embodiment, a narrowband Doppler or continuous wave (CW) sonar system is substituted in place of the aforementioned broadband ADCP.

The mass flowrate (Q) of the fluid in the conveyance medium can be determined through analysis of the fluid velocity information provided by the array/ADCP. In one embodiment, the determination of mass flowrate is made through the use of a computer algorithm running on a microcomputer system or processor which models the flow in the medium as being essentially symmetric around the center point of the flow area. For example, in a circular pipe, flow is modeled to be symmetric around the central longitudinal axis of the pipe, with the flow velocity varying with distance r from the center point according to a function f (r). Note that the function f (r) may be either empirically determined via velocity information obtained by the ADCP from multiple range cells, or mathematically modeled based on the measurement of one range cell within the pipe. The flow velocity is then averaged or integrated over the cross-section of the pipe to provide a figure representative of the average flow velocity in the pipe. This total flow velocity can then be used to calculate the average flow volume per unit time (Q), which may be multiplied by the known or measured density of the fluid to determine the mass flowrate. In other embodiments, other techniques and analytical methods of correlating the velocity profile data to a mass flowrate may be used.

One embodiment of a method of measurement of flow in pipes is described below. More details of these equations can be found in "Enhancements to Algorithm for Sewer Flow Monitor" (H R Wallingford, September 1974) and "Algorithms for Estimating Flow in Sewers" (H R Wallingford, March 1992). In one embodiment, the flow shape calculation uses Equation 1 as follows:

$$v = \alpha * (\sin \kappa \phi)^{\beta} * (1 + \gamma \theta) * (\cos \theta - \eta \cos 3\theta)^{\delta} \quad \text{(Eqn. 1)}.$$

In Equation 1, $\phi$ varies vertically 0 to $\pi$ and $\theta$ varies horizontally $\pm \pi/2$. The four components of flow are:

| | |
|---|---|
| $\alpha (\sin \kappa \phi)^{\beta}$ | vertical variation (centerline) |
| $(\cos \theta)^{\delta}$ | transverse variation |
| $(1 + \gamma \theta)$ | transverse skewness |
| $(-\eta \cos 3\theta)^{\delta}$ | transverse bulge (twin maxima) |

In one embodiment, the 6 variables in equation 1 are defined as follows and are within the specified range:

| | |
|---|---|
| $\alpha$ (alpha) Scale Factor | −5.00 to 5.00 |
| $\beta$ (beta) Vertical Shape | −2.00 to 2.00 |
| $\kappa$ (kappa) Vertical Peak Location | 0.56 to 1.00 |
| $\delta$ (delta) Transverse Shape | 0.00 to 0.30 |
| $\gamma$ (gamma) Skewness | −0.30 to 0.30 |
| $\eta$ (eta) Bulge (twin maxima) | 0.00 to 0.10 |

In one embodiment, a least squares method is employed to solve for $\alpha$, $\beta$, and $\gamma$. For example, with $\eta=0.06$, $\kappa$ and $\delta$ are iterated for a best fit.

Figure 2:
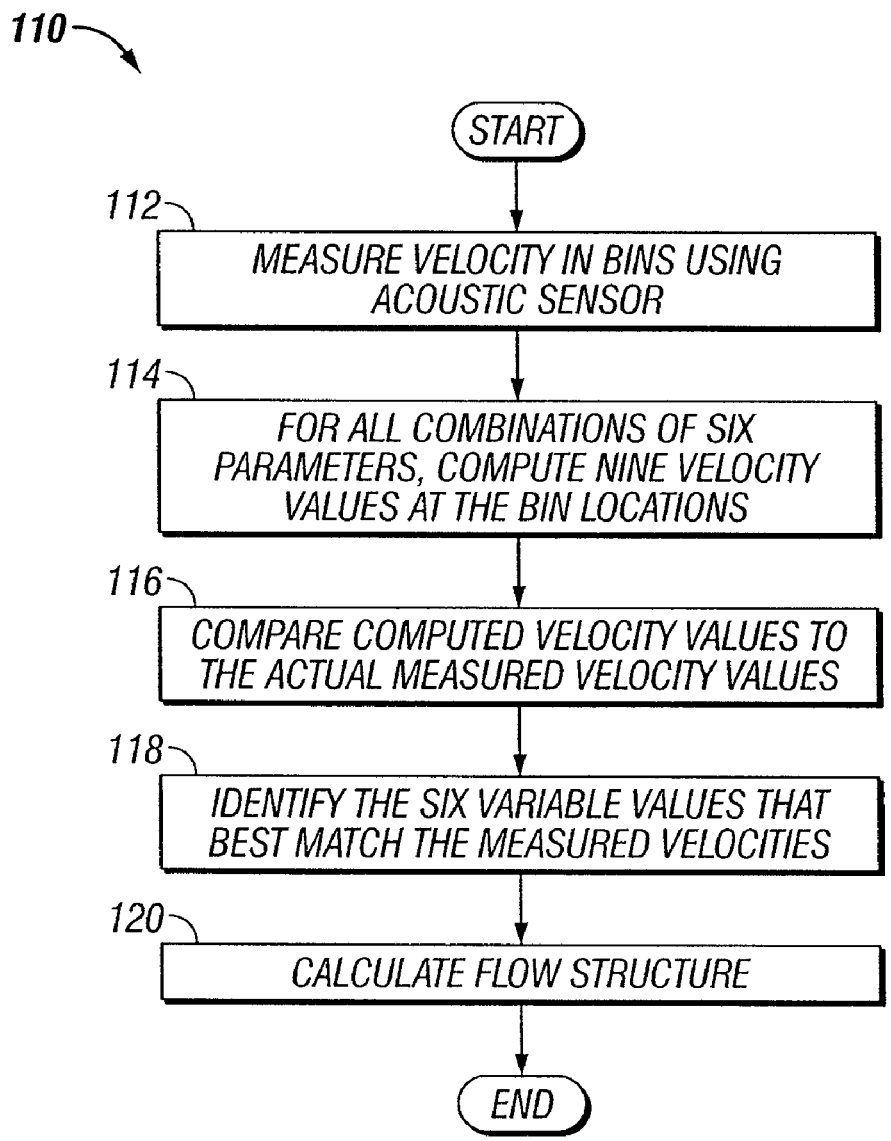
FIG. 2 is a flowchart illustrating an exemplary method of calculating fluid flow in a pipe based on data from a flow measurement device such as illustrated in FIG. 1.

FIG. 2 is a flowchart illustrating an exemplary method 110 of calculating fluid flow in a pipe based on data from the flow measurement device in a pipe. In one embodiment, the method 110 is performed by a processor in the electronics assembly 108. In one embodiment, the flow measurement calculation is incorporated into the firmware of such a processor in the electronics assembly 108. In another embodiment, the electronics assembly 108 provides the measured velocity bin data to an additional process located in another computer executing software for performing the method 110. The method 110 begins at a block 112 in which the fluid flow velocity is measured using a sensor such as an ADCP. In one embodiment, the sensor includes a three beam transducer that measures 9 velocity bins, e.g., 3 bins per beam, distributed over the flow area. Next at a block 114, the velocity values in the measured bins locations are calculated for essentially all combinations, e.g., in increments within the ranges above of 0.5% of the mean measured velocity for alpha and 1% of the 5 remaining variables above. Moving to a block 116, velocity values computed with the various combinations of variable values is compared to the measured velocity values. Next at a block 118, the processor identifies the six variable values that best match the measured velocities. In one embodiment, a least squares calculation is used to determine the best match. Moving to a block 120, the processor calculates the flow structure over the wet portion of the pipe using Equation 1.

In some embodiments, the systems and methods described herein are adapted for use with embodiments of the flow measurement system described in U.S. Pat. No. 6,647,804, entitled "System and Method for Flow Measurement in a Pipe," incorporated by reference in its entirety. Some embodiments may also be adapted for use in embodiments of acoustic Doppler current profilers such as are described in U.S. Pat. No. RE35,535, entitled "Broadband Acoustic Doppler Current Profiler," incorporated by reference in its entirety.

Moreover, while certain embodiments of the method 110 may be used with reference to the flow measuring device illustrated in FIG. 1, other embodiments may include measuring devices positioned in a hole made in the pipe so that the measuring device is flush with the inside bottom of pipe. In addition, in one embodiment, a self hardening liquid may be dispensed around a measuring device positioned on the bottom of a pipe to form a flow stabilizing structure similar in shape to that illustrated in FIG. 1.

As noted above, accuracy of certain pipe flow measurement techniques may be limited because the sensor and its interconnect cable disturb the flow it is actually trying to measure. In particular, this may result in overestimates of actual fluid velocity due to vortices formed by the fluid moving around and over the sensor and cable. These overestimates tend to be manifested as increased flow as pipe area is decreased. In addition, interconnect cable disturbance of the flow may result in overestimates of fluid depth due to upwards movement of the fluid over the sensor causing the depth sensor to erroneously report actual fluid depth. The combination of these two error sources tends to lead to erroneous calculations of velocity and area, leading to large errors in the total flow (Q) calculation.

In one embodiment, the transducer 104 is housed in the flow measurement device 100 discussed above with reference to FIG. 1. The low profile of the device 100 within the pipe tends to direct substantially all of the flow above the transducer 104 allowing the vertical beam to determine accurate water level. The device 100 also smoothes the flow over the measurement area to reduce turbulent flow over the transducer 104 and allow the velocity measurement beams to accurately measure undisturbed fluid velocity. This improvement in flow over the transducer is further improved by having the cable 106 enter the device 100 at an end away from the transducers to move the cable exit away from measurement area.

Figure 3:
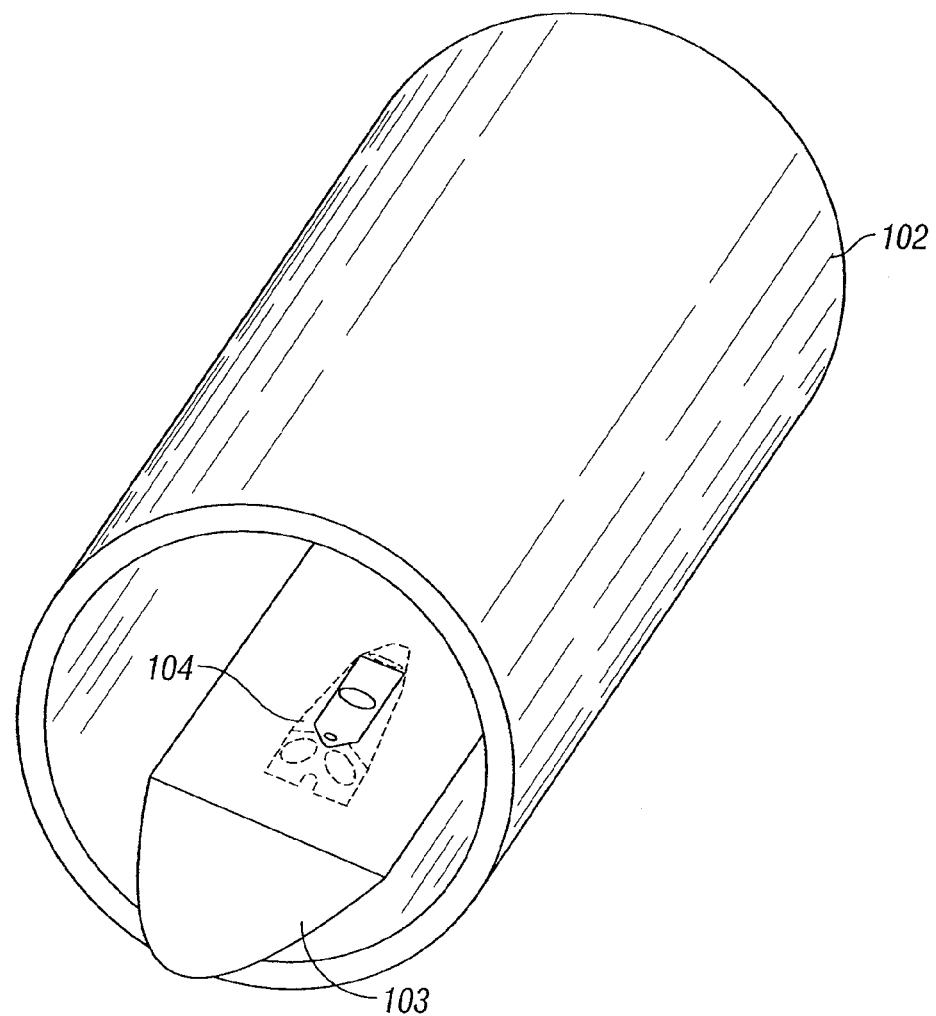
FIG. 3 is a perspective view illustrating the exemplary flow measuring device of FIG. 2 when positioned in the pipe.

FIG. 3 is a perspective view illustrating the flow measuring device 100 when positioned in the pipe 102. The bottom surface of the housing 103 substantially conforms to the inner surface of the pipe 102 so that the fluid flows relatively smoothly over the measurement area around the transducer 104.

Figure 4:
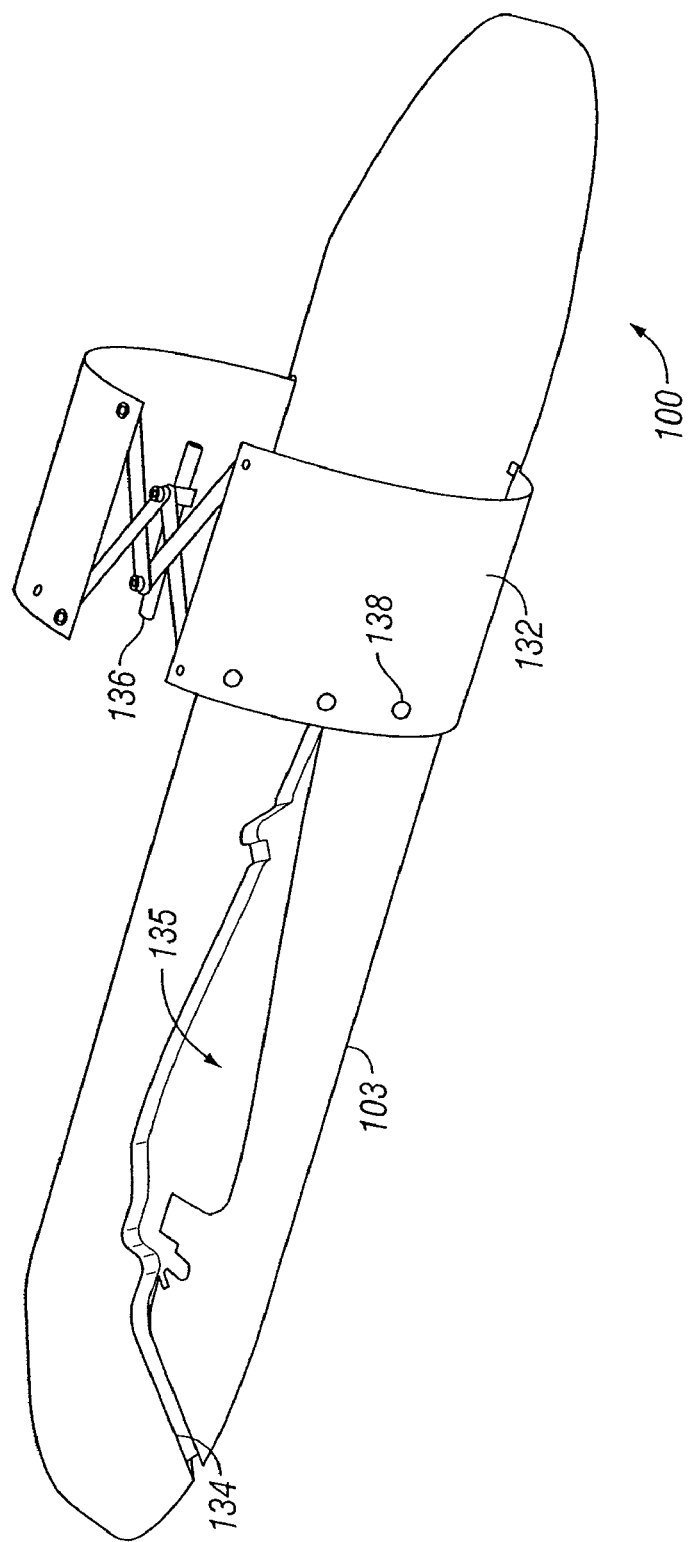
FIG. 4 is a perspective view of another embodiment that includes an exemplary flow measuring device such as illustrated in FIG. 2 that includes an adjustable band for positioning the flow measuring device within the pipe.

FIG. 4 is a perspective view of the flow measurement device 100 that includes an adjustable band 132 for positioning the flow measuring device within the pipe. In FIG. 4, the transducer 104 is absent to illustrate a recess 135 in the housing 103 in which the transducer 104 is received. In one embodiment, a clamp 136 is used to expand or contract the diameter of the band 132 to the size of the pipe 102 to secure the measurement device 100 within the pipe. In one embodiment, the housing 103 includes one or more fastening points such as screw holes 138 for affixing the band 132 to the housing 103. In one embodiment, the band 132 passes through a slot in the housing 103 to affix the flow measurement device 100 to the band 132. The band 132 and the clamp are preferably formed of a suitable corrosion resistant material that may vary with the contents of the fluid flowing in the pipe. In one embodiment, the device 100 has dimensions of 0.75"×6"×36" with the band 132 having dimensions of 1/16"×4"×12" diameter. In FIG. 4, the band 132 has a diameter of 8".

Figure 5:
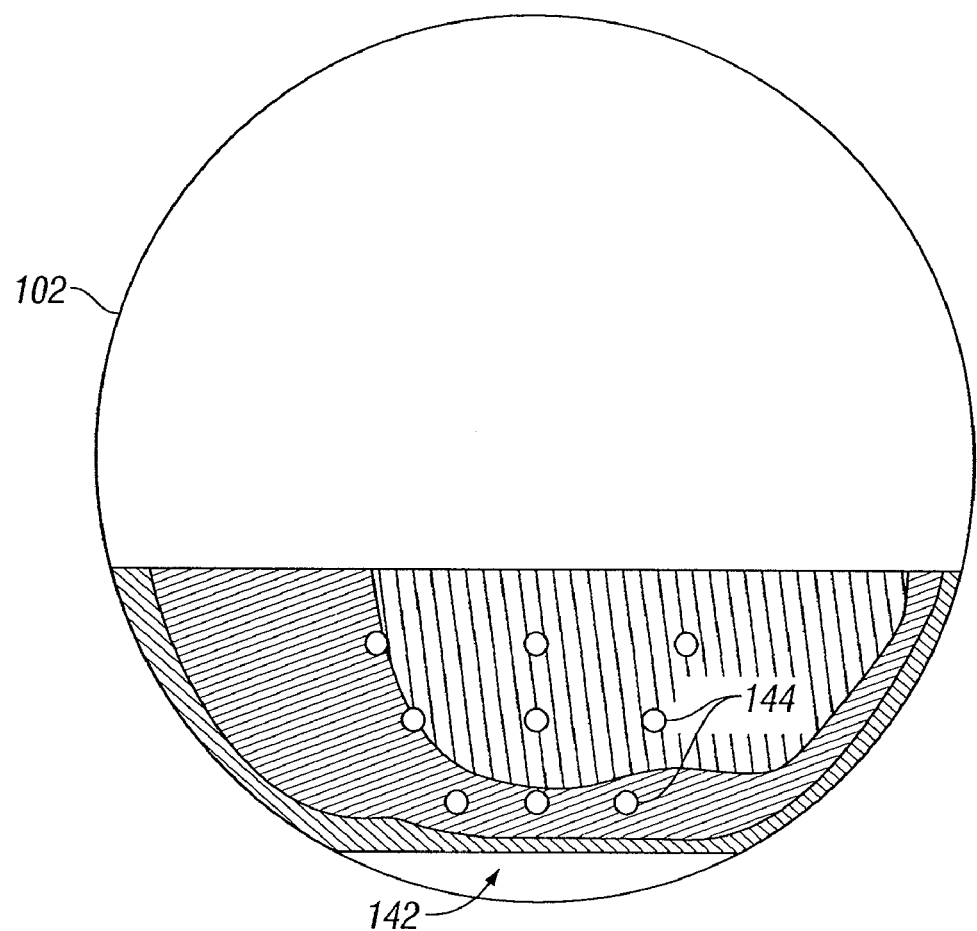
FIG. 5 is an illustration of a two dimensional flow structure in a pipe as measured using a device such as illustrated in FIG. 1.

FIG. 5 is an illustration of a two dimensional flow structure in the pipe 102 as measured using the device 100. In one embodiment, the device 100 may be connected to a computer display that is configured to display the fluid flow structure graphically. FIG. 5 illustrates fluid flow in a partially filled pipe 102. The position of the device 100 itself is indicated in the region 142 at the bottom of the display. The approximate area of each of the velocity measurement bins within the flow is indicated by the indicators 144 in the illustration of FIG. 5. Variations in the two-dimensional mass flow, Q, are illustrated by variations in shading. In one embodiment, a color display uses different colors to depict variations in the mass flow.

Embodiments of the device 100 may be used to measure fluid flow of, for example, wastewater systems (sewers, storm drains, pipes etc. . . . ), irrigation canals (open channel), pump station outlets, industrial water and waste water treatment facilities, discharge and cooling water intake canals for power plants. In one embodiment, the housing 103 may be sized to fit 8"-36" pipes carrying potable and non-potable water. The pipes may be fully or only partially filled with fluid.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A device for measuring fluid flow in a pipe, the device comprising:
   a transducer configured to acoustically measure the velocity of fluid flow through a pipe; and
   a housing configured to receive the transducer and comprising:
      a first surface configured to conform to an inner surface of the pipe; and
      a second surface configured to direct the fluid flow over the transducer.

2. The device of claim 1, wherein said housing further comprises:
   a passage disposed within the housing and configured to receive a cable that is connected to the transducer.

3. The device of claim 1, further comprising a band configured to position the housing within the pipe.

4. The device of claim 1, wherein the passage is positioned at a first end of the housing.

5. The device of claim 1, wherein a first surface of the transducer is configured to be flush with the second surface.

6. The device of claim 4, wherein the housing is tapered longitudinally with reference to the pipe along the second surface from first and second ends of the housing to the first surface of the transducer.

7. The device of claim 1, further comprising:
the cable connected to the transducer; and
an electronics assembly connected via the cable to the transducer.

8. The device of claim 1, wherein the housing is formed from a urethane material.

9. A device for measuring fluid flow in a pipe, the device comprising:
means for measuring the velocity of fluid flow though a pipe; and
means for housing the transducer, the housing means conforming to an inner surface of the pipe and directing the fluid flow over the transducer.

10. The device of claim 9, further comprising means for positioning the housing means within the pipe.

11. The device of claim 9, further comprising:
means for processing data received from the measuring means; and
means for connecting the processing means with the measuring means.

12. A device for housing a transducer in a pipe, the device comprising:
a recess configured to receive a transducer;
a first surface configured to conform to the shape of a pipe; and
a second surface having an opening to the recess and configured to direct the fluid flow over the transducer.

13. The device of claim 12, further comprising:
a passage disposed between the first and second surfaces and configured to receive a cable that is connected to the transducer.

14. The device of claim 12, further comprising a band configured to position the housing within the pipe.

15. The device of claim 12, wherein the passage is positioned at a first end of the housing.

16. The device of claim 12, further comprising a transducer.

17. The device of claim 16, wherein a first surface of the transducer is configured to be flush with the second surface.

18. The device of claim 12, wherein the device is tapered longitudinally with reference to the pipe along the second surface from first and second ends of the device to the opening to the recess.

19. A method of measuring fluid flow in a pipe, the method comprising:
parameterizing a fluid flow in terms of a plurality of variables;
measuring fluid velocities at a plurality of locations within the pipe;
predicting fluid flow velocities at the plurality of locations using a range of values for each of the plurality of variables;
identifying which of the values of the variables within the respective range of values predicts fluid velocities at the plurality of locations that are closest to the measured fluid velocities; and
determining fluid flow within the pipe using the identified values of the variables.

20. The method of claim 19, wherein the range of values for each of the plurality of variables is selected from a predetermined range of values.

21. The method of claim 19, wherein the identifying comprises: performing a least squares fit.

22. The method of claim 19, wherein the predicting comprises applying the equation $v=\alpha*(\sin \kappa\phi)^{\beta}*(1+\gamma\theta)*(\cos \theta - \eta \cos 3\theta)^{\delta}$ and wherein the variables comprise a scale factor $\alpha$, a vertical shape parameter $\beta$, a vertical peak location $\kappa$, a transverse shape parameter $\delta$, a skewness parameter $\gamma$, and a bulge factor $\eta$.

23. The method of claim 22, wherein the scale factor $\alpha$ is in the range of −5.00 to 5.00, the vertical shape parameter $\beta$ is in the range of −2.00 to 2.00, the vertical peak location $\kappa$ is within the range 0.56 to 1.00, the transverse shape parameter $\delta$ is within the range of 0.00 to 0.30, the skewness parameter $\gamma$ is in the range −0.30 to 0.30, and the bulge factor $\eta$ is in the range 0.00 to 0.10.

* * * * *